(12) United States Patent
Scacchi et al.

(10) Patent No.: US 9,994,303 B2
(45) Date of Patent: Jun. 12, 2018

(54) CONTROL SYSTEM AND METHOD FOR AN AIRCRAFT

(71) Applicant: Airbus Operations (S.A.S.), Toulouse (FR)

(72) Inventors: Pierre Scacchi, Toulouse (FR); Thierry Bourret, Toulouse (FR); Franck Laine, Colomiers (FR); Matthieu Mayolle, Tournefeuille (FR); Sabrina Betton, Beauzelle (FR); Cécile Puissacq, Toulouse (FR); Olivier Sapin, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 342 days.

(21) Appl. No.: 14/808,453

(22) Filed: Jul. 24, 2015

(65) Prior Publication Data
US 2016/0185448 A1  Jun. 30, 2016

(30) Foreign Application Priority Data

Jul. 25, 2014 (FR) ...................................... 14 57178

(51) Int. Cl.
| | | |
|---|---|---|
| *B64C 13/22* | (2006.01) | |
| *G05D 1/00* | (2006.01) | |
| *B64C 13/04* | (2006.01) | |
| *B64D 43/00* | (2006.01) | |
| *B64C 13/18* | (2006.01) | |
| *G01C 23/00* | (2006.01) | |

(52) U.S. Cl.
CPC .............. *B64C 13/22* (2013.01); *B64C 13/04* (2013.01); *G05D 1/0061* (2013.01); *B64C 13/18* (2013.01); *B64D 43/00* (2013.01); *G01C 23/005* (2013.01)

(58) Field of Classification Search
CPC ................................. B64C 13/04; B64C 13/22
See application file for complete search history.

(56) References Cited

U.S. PATENT DOCUMENTS

| | | | |
|---|---|---|---|
| 3,337,163 A | * | 8/1967 | Frudenfeld ............ B64C 13/24 244/197 |
| 5,868,359 A | | 2/1999 | Cartmell et al. |

(Continued)

FOREIGN PATENT DOCUMENTS

| | | |
|---|---|---|
| DE | 10 2006 006995 A1 | 8/2007 |
| FR | 2894935 A1 | 6/2007 |

(Continued)

OTHER PUBLICATIONS

French Search Report for Application No. FR 1457178 dated Apr. 21, 2015.

*Primary Examiner* — Nicholas McFall
(74) *Attorney, Agent, or Firm* — Jenkins, Wilson, Taylor & Hunt, P.A.

(57) ABSTRACT

A control system and method for an aircraft configured to operate according to a first mode of operation corresponding to an automatic piloting of the aircraft and a second mode of operation corresponding to a manual piloting of the aircraft, the system including a selection member. The system is configured to operate according to the first mode of operation when the selection member is not actuated continuously and to operate according to the second mode of operation when the selection member is actuated continuously.

9 Claims, 2 Drawing Sheets

(56) References Cited

U.S. PATENT DOCUMENTS

| | | |
|---|---|---|
| 2005/0056730 A1 | 3/2005 | Nagayama et al. |
| 2007/0159005 A1 | 7/2007 | Bourret et al. |
| 2011/0018739 A1 | 1/2011 | Dehais |
| 2013/0190949 A1 | 7/2013 | Constans et al. |

FOREIGN PATENT DOCUMENTS

| | | |
|---|---|---|
| FR | 2929246 A1 | 10/2009 |
| FR | 2984267 A1 | 6/2013 |
| WO | WO 01/12505 A1 | 2/2001 |

* cited by examiner

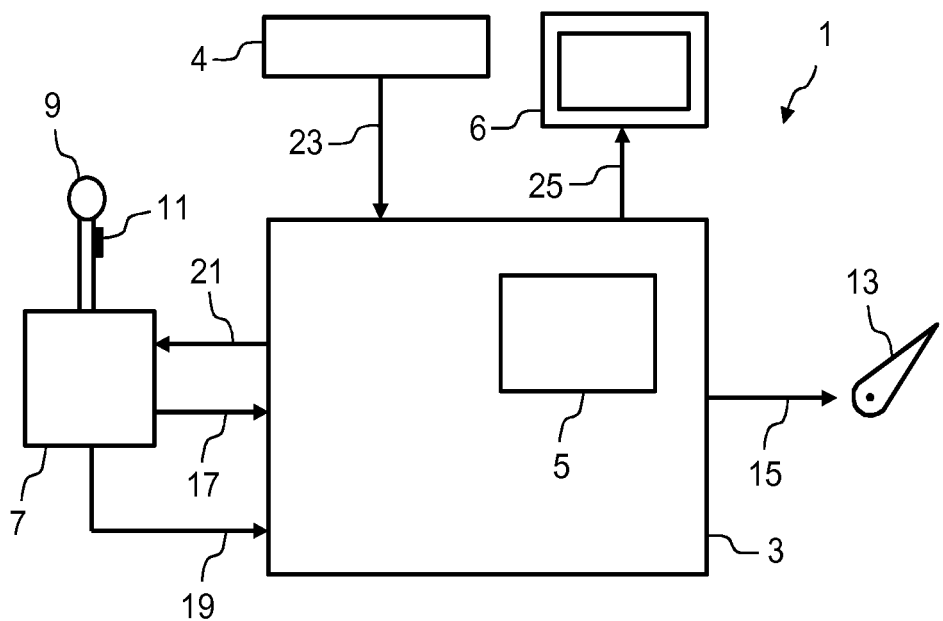
Fig. 1
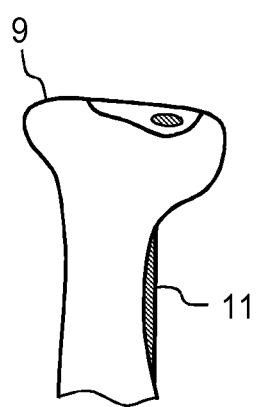 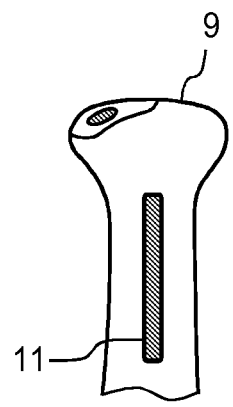
Fig. 2a   Fig. 2b

CONTROL SYSTEM AND METHOD FOR AN AIRCRAFT

CROSS-REFERENCE TO RELATED APPLICATION

This application claims the benefit of and priority to French patent application No. 14 57178 filed on Jul. 25, 2014, the entire disclosure of which is incorporated by reference herein.

TECHNICAL FIELD

The disclosure herein relates to a system and a method for controlling an aircraft.

BACKGROUND

Modern aircraft, in particular transport airplanes, comprise an automatic piloting system enabling a pilot of the aircraft to select at least one guidance mode which is implemented automatically by the automatic piloting system when the automatic piloting is engaged. For example, in a cruising flight phase of the aircraft, a guidance mode may consist in following a previously defined flight plan. In a take-off phase of the aircraft, a guidance mode may consist in keeping the wings of the aircraft flat when rolling on a take-off runway: when the automatic piloting is engaged, the automatic piloting system automatically controls the roll angle of the aircraft so as to keep the wings of the aircraft flat. Another guidance mode relates to an automatic rotation of the aircraft upon take-off: when the automatic piloting is engaged, the automatic piloting system automatically controls the aircraft in such a way as to keep it on the ground while travelling to take-off until it reaches a predefined rotation speed Vr, then it controls the rotation of the aircraft by controlling the pitch angle. These two guidance modes can be combined during the take-off phase of the aircraft.

To activate the automatic piloting of the aircraft, the pilot has to select at least one guidance mode, either by buttons situated on a control panel, or by selecting this guidance mode in dedicated screen pages, then he or she has to engage the automatic piloting by pressing on a button generally situated on a control panel of FCU (Flight Control Unit) type situated between display screens of the cockpit and the windshield. In some situations, it may be necessary for a pilot of the aircraft to deactivate the automatic piloting to switch to a manual piloting mode. These situations may, for example, correspond to avoidance maneuvers performed in manual piloting mode. Thus, in cruising flight phase, it may be necessary to perform an avoidance maneuver to avoid a weather disturbance. In take-off phase, it may be necessary to perform an avoidance maneuver, for example to avoid birds in proximity to the take-off runway. Conventionally, the pilot deactivates the automatic piloting of the aircraft by pressing on a button situated on the control wheel, the control column or the mini-stick of the aircraft, then he or she manually controls the aircraft by the control wheel, the control column of the mini-stick (depending on the type of aircraft). If, after this manual control of the aircraft, the pilot wants to re-engage the automatic piloting, he or she must again press on the button situated on the FCU. Upon taking the situation of the FCU in the cockpit into account, the pilot has to lean forward to press on this button. This may be stressful for the pilot in a flight phase such as take-off, during which the pilot has to be particularly attentive to numerous events. He or she may then prefer to continue the take-off in manual piloting mode after having performed the avoidance maneuver, rather than re-engage the automatic piloting to continue the take-off. In cruising phase, modern aircraft are particularly stable even in the absence of control from the pilot on the control column or the mini-stick, when the aircraft is in manual piloting mode. The result thereof is that it is necessary to display clearly visible indicators on the screens of the cockpit to enable the pilot to be aware of the piloting mode engaged (automatic piloting or manual piloting).

When the pilot disengages the automatic piloting by pressing on the button situated on the control wheel, the control column or on the mini-stick, the automatic piloting system of the aircraft may still display a flight director on a screen of the cockpit. This flight director corresponds to the guidance modes previously selected by the pilot. It therefore enables the pilot to control the aircraft in a manner consistent with the automatic piloting which was previously engaged. However, when the pilot disengages the automatic piloting to perform an avoidance maneuver, this avoidance trajectory is not generally consistent with the selected guidance modes. The result thereof is that the flight director is then not useful. The pilot can clear its display, but this has the effect of deselecting the guidance modes. If the pilot wants to re-engage the automatic piloting after having performed the avoidance maneuver, he then has to reselect the desired guidance mode or modes before pressing on the button of the FCU to engage the automatic piloting, which increases his or her workload.

SUMMARY

An object of the present disclosure is to remedy the above-mentioned drawbacks. It relates to a control system for an aircraft configured to operate according to a first mode of operation corresponding to an automatic piloting of the aircraft and a second mode of operation corresponding to a manual piloting of the aircraft, the system comprising a selection member that can be actuated by a pilot of the aircraft, the selection member being configured either to deliver an active status signal when it is actuated, or to be given an inactive status signal when it is not actuated. This system is noteworthy in that:
  the system is configured to operate according to the first mode of operation when the selection member delivers an inactive status signal; and
  the system is configured to operate according to the second mode of operation when the selection member delivers an active status signal.

This system controls the aircraft in automatic piloting mode permanently, except when the pilot exerts an action on the selection member to control the aircraft in manual piloting mode. To switch to manual piloting mode, the pilot must exert an action on the selection member; when he or she releases this selection member, that is to say when he or she stops exerting this action, the system reverts to the first mode of operation corresponding to an automatic piloting. Consequently, this system offers an advantage of reverting automatically to the first mode of operation when a pilot of the aircraft releases the selection member, without requiring any specific action from the pilot for this. The result thereof is that the task of the pilot is simplified and his or her workload reduced. Furthermore, the pilot does not risk forgetting to re-engage the automatic piloting mode after having switched to manual piloting mode, for example to perform an avoidance maneuver. It is not therefore necessary to provide a clearly visible display on a screen of the cockpit to enable the pilot to be aware of the piloting mode: the pilot knows that, as soon as he or she releases the selection member, the aircraft is in automatic piloting mode.

According to particular embodiments that can be taken into account in isolation or in combination:

the selection member is configured to deliver the active status signal only when it is actuated continuously;

when the system operates according to the first mode of operation, it controls the display of a flight director on a screen of the cockpit of the aircraft and, when it operates according to the second mode of operation, it disables the display of the flight director;

the control system is configured to control attitude and/or roll angles of the aircraft, in such a way that, upon switching from the first mode of operation to the second mode of operation because of an actuation of the selection member, the system continues to control attitude and/or roll angles that are unchanged until it receives a control signal originating from a control member of the aircraft and corresponding to a modification of the value of at least one of the attitude and/or roll angles;

the system is configured to display information on a screen of the cockpit of the aircraft when it operates according to the second mode of operation, this information corresponding to a guidance of the aircraft which would be produced by the control system if it were to revert to the first mode of operation because the actuation of the selection member was stopped;

the system is configured to store at least one current guidance objective upon switching from the first mode of operation to the second mode of operation because of an actuation of the selection member, then to guide the aircraft according to this at least one stored guidance objective, following a return to the first mode of operation because the actuation of the selection member was stopped. In one embodiment, this guidance objective corresponds to at least one guidance mode and/or to guidance setpoints previously selected by a pilot of the aircraft;

the system further comprises an objective selector likely to be activated by a pilot of the aircraft, the system being further configured to store at least one current guidance objective upon switching from the first mode of operation to the second mode of operation because of an actuation of the selection member, then upon a return to the first mode of operation because the actuation of the selection member was stopped, to guide the aircraft according to:

a trajectory corresponding to a current trajectory of the aircraft upon the return to the first mode of operation, as long as the objective selector is not activated after this return to the first mode of operation; and this at least one stored guidance objective, after an activation of the objective selector after the return to the first mode of operation.

The disclosure herein also relates to an aircraft comprising a control system as mentioned above.

The disclosure herein also relates to a method for controlling an aircraft, the aircraft comprising a control system configured to operate according to a first mode of operation corresponding to an automatic piloting of the aircraft and a second mode of operation corresponding to a manual piloting of the aircraft, the system comprising a selection member that can be actuated by a pilot of the aircraft, the selection member being configured either to deliver an active status signal when it is actuated, or to deliver an inactive status signal when it is not actuated. This method is noteworthy in that:

when the selection member delivers an inactive status signal, the system operates according to the first mode of operation; and when the selection member delivers an active status signal, the system operates according to the second mode of operation.

BRIEF DESCRIPTION OF THE DRAWINGS

The disclosure herein will be better understood on reading the following description and studying the attached figures.

FIG. 1 represents, schematically, a control system according to one embodiment of the disclosure herein.

FIGS. 2A and 2B are respectively side and front views of the top part of a mini-stick according to one embodiment of the disclosure herein.

DETAILED DESCRIPTION

Figure 3:
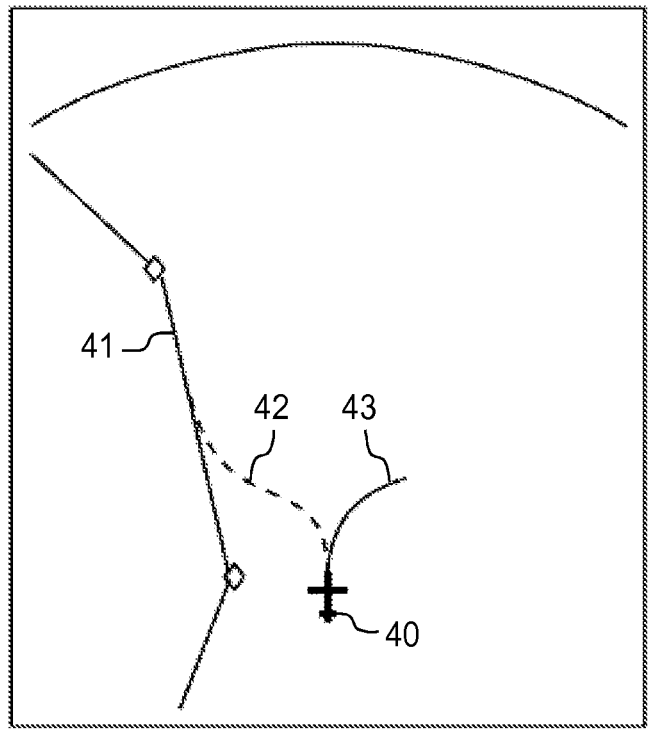
FIGS. 3 and 4 respectively illustrate the display on a navigation screen and on a vertical display screen in a particular embodiment of the disclosure herein.

The control system 1 of an aircraft represented in FIG. 1 comprises a guidance system 3 of the aircraft. This guidance system comprises an automatic piloting unit 5 of the aircraft. The control system 1 also comprises a human-machine interface unit 7. The latter comprises a control wheel, a control column or a mini-stick 9, and a selection member 11. A first input of the guidance system 3 is linked to a first output of the human-machine interface unit 7 by a link 17. A second input of the guidance system 3 is linked to a second output of the human-machine interface unit 7 by a link 19. An output of the guidance system 3 is linked, by a link 15, to an input of a control unit (not represented) for control surfaces 13 of the aircraft. Without departing from the context of the disclosure herein, a number of control units can be provided to control the different control surfaces of the aircraft. Another input of the guidance system 3 is linked to an output of a control panel 4 of the cockpit of FCU (Flight Control Unit) type by a link 23.

In a preferred embodiment represented in FIGS. 2A and 2B, the selection member 11 is arranged on the mini-stick 9. In the embodiment represented in the figures, the selection member corresponds to a trigger that can be actuated by a pilot when he or she holds the mini-stick 9 in his or her hand. According to another embodiment that is not represented, the selection member corresponds to an area of the mini-stick that is sensitive to pressure and able to activate a signal when the pilot grasps the mini-stick in his or her hand.

In operation, the human-machine interface unit 7 transmits, on its first output, at least one signal representative of the position of the mini-stick 9. The human-machine interface unit 7 also transmits, on its second output, a status signal delivered by the selection member 11. This status signal corresponds either to an inactive status signal when the selection member 11 is not actuated, or to an active status signal when the selection member is actuated by a pilot. The guidance system 3 receives, on its second input, via the link 19, the status signal delivered by the selection member. When this status signal is inactive, the guidance system is configured to operate according to a first mode of operation corresponding to an automatic piloting of the aircraft. The guidance system then delivers, on its output linked to the control unit of the control surfaces 13, control commands for the control surfaces computed automatically by the automatic piloting unit 5 according to at least one guidance mode selected by the pilot by the control panel of FCU type. When the status signal delivered by the selection member 11 is active, the guidance system 3 is configured to operate according to a second mode of operation corresponding to a manual piloting of the aircraft. The guidance system then delivers, on its output linked to the control unit of the control surfaces 13, control commands for the control surfaces computed as a function of the at least one signal representative of the position of the mini-stick. In particular, the control of the control surfaces makes it possible to control the attitude and/or roll angles of the aircraft, and to do so equally in automatic piloting mode and in manual piloting mode.

Thus, in the absence of a specific action by the pilot on the selection member arranged on the mini-stick, the guidance system 3 operates in automatic piloting mode for the aircraft. This mode of operation therefore constitutes the default mode of operation of the guidance system, since it is necessary for the latter to receive an active status signal originating from the selection member to switch to manual piloting mode. Consequently, the manual piloting mode is activated only upon a deliberate action from the pilot on the selection member. As soon as the pilot stops his or her action on the selection member, for example by releasing the mini-stick 9, the guidance system 3 reverts to its default mode of operation, namely the automatic piloting of the aircraft. Thus, the pilot does not have to perform any action to return the guidance system to automatic piloting mode when he or she has interrupted the automatic guidance for example to perform an avoidance maneuver in manual piloting mode.

Preferably, the selection member 11 is configured to deliver the active status signal when it is actuated continuously by the pilot. If the pilot releases his or her action on the selection member, then the status signal becomes inactive. The fact that the selection member 11 delivers the active status signal when it is actuated continuously is not incompatible with brief releases of the selection member 11 by the pilot, particularly when the pilot moves his or her hand on the selection member. For this, a filtering of the action of the pilot on the selection member is advantageously provided so as to avoid having the status signal become inactive when the pilot moves his or her hand on the selection member, which can lead to a brief releasing of the action of the pilot on the selection member. In the above-mentioned embodiments, according to which the selection member corresponds to a trigger or to a pressure-sensitive area arranged on the mini-stick 9, the status signal is active when the pilot rests his or her hand on the mini-stick and keeps the trigger or the pressure-sensitive area gripped. This corresponds to a situation in which the pilot can manually pilot the aircraft by the mini-stick. When he or she removes his or her hand from the mini-stick, he or she no longer keeps the trigger or the sensitive area gripped and consequently the status signal becomes inactive, which leads to a return of the system to the first mode of operation corresponding to an automatic piloting. This is consistent with the behavior of the pilot consisting in removing his or her hand from the mini-stick, since the pilot can then no longer act on the mini-stick to manually pilot the aircraft. The pilot can also place his or her hand on the mini-stick 9 without in any way gripping the trigger or the pressure-sensitive area: in this case, the status signal is inactive, which corresponds to an automatic piloting of the aircraft, but the pilot is then ready to act and he or she will not lose any time in bringing his or her hand onto the mini-stick if he or she has to perform a manual avoidance maneuver.

In a particular embodiment, the control system 1 further comprises at least one screen 6 linked to the guidance system 3 by a link 25. In the first mode of operation corresponding to an automatic piloting of the aircraft, the guidance system controls the display of a flight director on the screen 6. In the second mode of operation corresponding to a manual piloting of the aircraft, the guidance system disables the display of the flight director on the screen in order for the pilot not to be disturbed by the display of the flight director on this screen when he or she wants to pilot the aircraft manually.

Preferably, when the pilot actuates the selection member 11, which leads to the switch from the automatic piloting mode to the manual piloting mode, the guidance system continues to control the control surfaces 13 so as to control the attitude and/or roll angles of the aircraft that are unchanged, until it receives a control signal originating from the mini-stick 9, this control signal corresponding to a modification of the value of at least one of the angles. This makes it possible to maintain a stable control of the aircraft as long as the pilot does not act on the mini-stick 9, even though he or she has actuated the selection member 11.

In an advantageous embodiment, in the second mode of operation corresponding to the manual piloting of the aircraft, the guidance system controls the display, on the screen 6, of information corresponding to a guidance of the aircraft which would be produced by the control system if the latter were to revert to the first mode of operation corresponding to the automatic piloting because the actuation of the selection member 11 by the pilot was stopped. In particular, this information may correspond to the trajectory that the aircraft would follow in case of a return to the automatic piloting mode and/or to the guidance modes which would be activated. The display of the information enables the pilot to have a better awareness of the situation which would result from a return to the automatic piloting mode. The screen used to display this information can be a head-down screen or a head-up display of HUD type of the cockpit. In the case of the display on a display of HUD type, this information may be displayed only during certain particular phases of the flight of the aircraft, in particular when the latter is on the ground or close to the ground, so as not to overload the display during the other flight phases.

In a preferred embodiment, if at least one guidance mode, previously selected by the FCU, was engaged in automatic piloting before the activation of the manual piloting mode, this guidance mode is stored upon the activation of the manual piloting mode. This guidance mode is then automatically reactivated upon the return to the automatic piloting mode. Thus, the pilot does not have to perform any action to restore this at least one guidance mode upon the return to automatic piloting mode.

As an alternative to this preferred embodiment, if at least one guidance mode previously selected by the FCU was engaged in automatic piloting, this guidance mode is stored upon the activation of the manual piloting mode. Upon the return to the automatic piloting mode, the guidance system 3 controls the aircraft so as to keep it on the trajectory it was following in manual piloting, before the return to automatic piloting. The control system further comprises an objective selector (such as, for example, a pushbutton, an icon in a screen page or a touch-sensitive area on a screen) enabling the pilot to re-engage this stored guidance mode. When a number of guidance modes were selected and have been stored upon the activation of the manual piloting, the objective selector can be configured either to simultaneously re-engage all of the guidance modes (lateral and vertical), or to re-engage them individually.

Advantageously, the control system comprises a deactivation device or mechanism (such as, for example, a push-button, an icon in a screen page or a touch-sensitive area on a screen). When a guidance mode has been stored upon a switch to manual piloting, as mentioned previously, this deactivation device enables the pilot to deactivate this guidance mode before the return to the automatic piloting mode. Thus, if the pilot does not want this guidance mode to be re-engaged upon the return to automatic guidance mode, he or she does not have to wait for this return to automatic guidance mode to deactivate the guidance mode. This makes it possible to improve the transition from the manual piloting mode to the automatic piloting mode.

The examples of selection member 11 described previously correspond to a trigger or a pressure-sensitive area of the control column. However, these examples are not limiting on the disclosure herein and other embodiments can be envisaged. In particular, the selection member 11 can also correspond to the mini-stick 9 associated with at detection circuit, this detection circuit being configured to deliver the active status signal when the mini-stick is inclined by an angle greater than a predetermined value relative to its rest position and to deliver the inactive status signal when the mini-stick is in its rest position or inclined by an angle less than the predetermined value relative to its rest position. Thus, when the pilot does not act on the mini-stick 9, the system controls the aircraft according to the first mode of operation corresponding to the automatic piloting. When the pilot acts sufficiently on the mini-stick to incline it by an angle greater than the predetermined value, the system controls the aircraft according to the second mode of operation corresponding to the manual piloting. The pilot does not then need to act on a specific member to switch to manual piloting mode: for this, he or she simply has to act on the mini-stick to perform a maneuver of the aircraft. When he or she releases the mini-stick, the system reverts automatically to the automatic piloting mode. In order to avoid a switch to manual piloting mode upon an involuntary action on the mini-stick 9, the latter preferably includes a stiffening device configured to oppose a force of a predefined value to the inclination of the mini-stick when the angle of inclination thereof is less than the predetermined value (therefore when the system is configured to operate according to the first mode of operation corresponding to an automatic piloting). Advantageously, the stiffening device can furthermore be configured to oppose the inclination of the mini-stick with a force of a value less than the predefined value (even a zero force) when the system is configured to operate according to the second mode of operation corresponding to a manual piloting, that is to say when the angle of inclination of the mini-stick is greater than the predetermined value. Thus, to switch to manual piloting mode, it is necessary to apply to the mini-stick a force greater than the predetermined value. This makes it possible to reduce the risk of an involuntary action on the mini-stick. Then, once the system is configured in manual piloting mode, a reduced force, even zero, is sufficient to act on the mini-stick so as to control the attitude and/or pitch angles in manual piloting mode. For this, the guidance system 3 sends an indication, via a link 21, to the stiffening device of the mini-stick 9, to require a reduction of the force opposed by this stiffening device. On the one hand, this reduction of the force allows for better piloting comfort for the pilot and, on the other hand, it enables the pilot to be aware of the change of piloting mode, upon switching from the automatic piloting mode to the manual piloting mode.

The following description makes it possible to illustrate the advantage of a device according to an embodiment of the disclosure herein in two particular cases in a flight of the aircraft. These two particular cases are of course not limiting on the possibilities of use of the disclosure herein.

A first particular case relates to the take-off of the aircraft. As is known, the combination of two guidance modes is used to perform a take-off in automatic piloting mode: a first, so-called "automatic rotation" mode and a second so-called "keeping wings flat" mode. The automatic rotation mode acts on the pitch axis of the aircraft. Its objectives are notably:

to keep the aircraft on the ground during its travel to take-off, up to a characteristic rotation speed Vr;
to perform the rotation (inclination of the fuselage by lifting the front part) of the aircraft when it reaches the speed Vr, by controlling an optimal rotation rate;
to stabilize the aircraft with a balance attitude angle allowing for an optimized transition to the next flight phase (initial climb of the aircraft).

For its part, the keeping wings flat mode acts on the roll angle of the aircraft. The objective of this mode is to control the roll angle of the aircraft so that it keeps its wings flat.

These two guidance modes are considered engaged upon a take-off of the aircraft. The control system of the aircraft is configured according to the first mode of operation and it therefore controls the take-off in automatic piloting mode. However, in certain circumstances, the pilot may want to perform an avoidance maneuver consisting, for example, in:

advancing the rotation of the aircraft, before it reaches the speed Vr, for example so as to avoid an obstacle on the runway; or
delaying the rotation of the aircraft, so as to perform the rotation after the aircraft has reached the speed Vr, for example to avoid a cloud of birds.

For this, the pilot takes the mini-stick 9 in hand and actuates the selection member 11, which causes the control system to be configured in the second mode of operation corresponding to the manual piloting. The pilot then controls the pitch angle and the roll angle of the aircraft so as to avoid the obstacle on the runway or the cloud of birds. By virtue of the disclosure herein, after having avoided the obstacle or the cloud of birds, the pilot can release the selection member 11, even the mini-stick 9, which causes the control system of the aircraft to be configured in the first mode of operation corresponding to the automatic piloting. The control system then continues the take-off entirely automatically, without requiring any other action on the part of the pilot. Thus, by virtue of the disclosure herein, after having performed the avoidance maneuver in manual piloting mode, the pilot does not need to re-engage the automatic pilot, or reselect the two guidance modes, to be able to continue the take-off automatically. This is particularly advantageous given that the take-off is a flight phase that requires great attention on the part of the pilot and a significant workload when it is performed in manual piloting.

Figure 4:
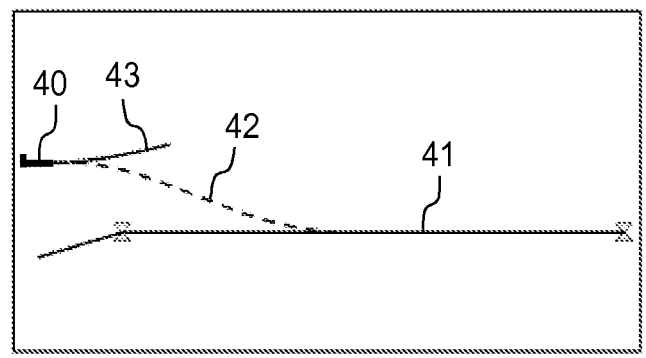

A second particular case relates to the following of a flight plan by the aircraft. For this, the pilot engages, by the FCU, guidance modes making it possible to follow a flight plan. The control system of the aircraft controls the control surfaces of the aircraft so as, on the one hand, to rejoin the flight plan if necessary, and, on the other hand, to guide the aircraft through the flight plan. In certain circumstances, the pilot may want to perform an avoidance maneuver, for example to avoid a weather disturbance or a flying object such as a hot air balloon. For this, he or she takes the mini-stick 9 in his or her hand and actuates the selection member 11, which causes the control system to be configured in the second mode of operation corresponding to the manual piloting. The pilot can then control the aircraft by the mini-stick 9 so as to perform the avoidance maneuver. Once the avoidance maneuver is performed, he or she can release the selection member 11, even the mini-stick 9, which causes the control system of the aircraft to be configured in the first mode of operation corresponding to the automatic piloting. The control system then continues to control the aircraft according to the guidance modes previously engaged, which enables the aircraft firstly to rejoin the flight plan (if the avoidance maneuver has deviated it therefrom), and then follow the flight plan. Advantageously, the guidance system 3 computes a predicted trajectory and controls the display of the predicted trajectory on a screen 6 of the cockpit, preferably on a navigation screen. This predicted trajectory corresponds to the trajectory according to which the control system would guide the aircraft if the pilot were to release the selection member to revert to automatic piloting mode. FIG. 3 illustrates an example of a corresponding display on a navigation screen of ND (Navigation Display) type of the cockpit of the aircraft. This display comprises a series of segments 41 joining waypoints of the flight plan, so as to represent the flight plan. The predicted trajectory 42 is displayed by dotted lines ahead of the current position 40 of the aircraft. In the example represented in the figure, this predicted trajectory makes it possible to rejoin the flight plan 41. This display enables the pilot to be aware of the control of the aircraft which would be produced in automatic piloting mode if he or she were to release the selection member 11. Although not necessarily, the guidance system may also compute a current trajectory prediction corresponding to the current manual piloting performed by the pilot of the aircraft by the mini-stick 9. In this case, the guidance system controls the display of the current trajectory prediction 43 on the navigation screen. When the display of the current trajectory prediction 43 is combined with the display of the predicted trajectory 42, the pilot can, at a glance, assess the current situation of the aircraft and choose accordingly the piloting actions that he or she will perform: maintain current piloting commands given by the mini-stick 9, modify current piloting commands given by the mini-stick 9 so as to modify the current trajectory prediction 43 or, release the selection member so as to revert to automatic piloting mode (which causes the aircraft to be guided according to the predicted trajectory 42). Preferably, in addition to their display on the navigation screen, the flight plan 41, the predicted trajectory 42 and the current trajectory prediction 43 are also displayed on a vertical display of VD type associated with the navigation screen of ND type, as represented in FIG. 4. This enables the pilot to assess the different trajectories both by projection in a horizontal plane (ND) and by projection in a vertical plane (VD). Alternatively, or even in combination with the above-mentioned displays of ND and VD types, a corresponding display may be provided on a head-up display screen of HUD type.

The control system and method disclosed herein can be implemented in software in combination with hardware and/or firmware. For example, the subject matter described herein can be implemented by software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control system for an aircraft configured to operate according to a first mode of operation corresponding to an automatic piloting of the aircraft and a second mode of operation corresponding to a manual piloting of the aircraft, the control system comprising a selection member that is configured to be actuated by a pilot of the aircraft,
wherein the control system is configured to operate according to the first mode of operation when the selection member is not actuated continuously;
wherein the control system is configured to operate according to the second mode of operation when the selection member is actuated continuously;
wherein the control system is configured to control attitude or roll angles of the aircraft or control both attitude and roll angles of the aircraft; and
wherein the control system is further configured such that, upon switching from the first mode of operation to the second mode of operation because of an actuation of the selection member, the control system continues to control attitude or roll angles of the aircraft, or control both attitude and roll angles of the aircraft, that are unchanged until the control system receives a control signal originating from a control member of the aircraft and corresponding to a modification of a value of at least one of the attitude or roll angles.

2. The control system as claimed in claim 1, configured such that, when the control system operates according to the first mode of operation, the control system enables a display of a flight director on a screen of a cockpit of the aircraft and, when the control system operates according to the second mode of operation, the control system disables the display of the flight director.

3. The control system as claimed in claim 1, configured to display information on a screen of a cockpit of the aircraft when the control system operates according to the second mode of operation, the information corresponding to a guidance of the aircraft which would be produced by the control system if the control system were to revert to the first mode of operation because the actuation of the selection member was stopped.

4. The control system as claimed in claim 1, configured to store at least one current guidance objective upon switching from the first mode of operation to the second mode of operation because of an actuation of the selection member, then to guide the aircraft according to the this at least one stored guidance objective, following a return to the first mode of operation because the actuation of the selection member was stopped.

5. The control system as claimed in claim 4, wherein the guidance objective corresponds to at least one guidance mode or to guidance setpoints previously selected by a pilot of the aircraft.

6. The control system as claimed in claim 1, further comprising an objective selector configured to be activated by a pilot of the aircraft, the control system being further configured to store at least one current guidance objective upon switching from the first mode of operation to the second mode of operation because of an actuation of the selection member, then upon a return to the first mode of operation because the actuation of the selection member was stopped, to guide the aircraft according to:
  a trajectory corresponding to a current trajectory of the aircraft upon the return to the first mode of operation, as long as the objective selector is not activated after this return to the first mode of operation; and
  the at least one stored guidance objective, after an activation of the objective selector after the return to the first mode of operation.

7. An aircraft comprising a control system, the control system comprising:
  a first mode of operation corresponding to an automatic piloting of the aircraft;
  a second mode of operation corresponding to a manual piloting of the aircraft; and
  a selection member that is configured to be actuated by a pilot of the aircraft;
  wherein the control system is configured to operate according to the first mode of operation when the selection member is not actuated continuously;
  wherein the control system is configured to operate according to the second mode of operation when the selection member is actuated continuously;
  wherein the control system is configured to control attitude or roll angles of the aircraft or control both attitude and roll angles of the aircraft; and
  wherein the control system is further configured such that, upon switching from the first mode of operation to the second mode of operation because of an actuation of the selection member, the control system continues to control attitude or roll angles of the aircraft, or control both attitude and roll angles of the aircraft, that are unchanged until the control system receives a control signal originating from a control member of the aircraft and corresponding to a modification of a value of at least one of the attitude or roll angles.

8. A method for controlling an aircraft, the method comprising:
  operating a control system onboard the aircraft according to a first mode of operation corresponding to an automatic piloting of the aircraft; and
  operating the control system onboard the aircraft according to a second mode of operation corresponding to a manual piloting of the aircraft, the control system comprising a selection member that is actuated by a pilot of the aircraft;
  wherein when the selection member is not actuated continuously, the control system operates according to the first mode of operation;
  wherein when the selection member is actuated continuously, the control system operates according to the second mode of operation;
  wherein the control system is configured to control attitude or roll angles of the aircraft or control both attitude and roll angles of the aircraft; and
  wherein the control system is further configured such that, upon switching from the first mode of operation to the second mode of operation because of an actuation of the selection member, the control system continues to control attitude or roll angles of the aircraft, or control both attitude and roll angles of the aircraft, that are unchanged until the control system receives a control signal originating from a control member of the aircraft and corresponding to a modification of a value of at least one of the attitude or roll angles.

9. The control system as claimed in claim 4, wherein the guidance objective corresponds to at least one guidance mode and to guidance setpoints previously selected by a pilot of the aircraft.

* * * * *